A. McR. HARRELSON.
UNIVERSAL MOTOR.
APPLICATION FILED JULY 8, 1915.

1,238,290.

Patented Aug. 28, 1917.
2 SHEETS—SHEET 1.

Inventor
Allen Mc Rae Harrelson
By [signature], Atty.

A. McR. HARRELSON.
UNIVERSAL MOTOR.
APPLICATION FILED JULY 8, 1915.

1,238,290. Patented Aug. 28, 1917.
2 SHEETS—SHEET 2.

Inventor
Allen McRae Harrelson
By J. C. Carnwell, Atty.

UNITED STATES PATENT OFFICE.

ALLEN McRAE HARRELSON, OF ST. LOUIS, MISSOURI, ASSIGNOR TO THE EMERSON ELECTRIC MANUFACTURING COMPANY, OF ST. LOUIS, MISSOURI, A CORPORATION OF MISSOURI.

UNIVERSAL MOTOR.

1,238,290.  Specification of Letters Patent.  Patented Aug. 28, 1917.

Application filed July 8, 1915. Serial No. 38,695.

*To all whom it may concern:*

Be it known that I, ALLEN MCRAE HARRELSON, a citizen of the United States, residing at the city of St. Louis, State of Missouri, have invented a certain new and useful Improvement in Universal Motors, of which the following is a full, clear, and exact description, such as will enable others skilled in the art to which it appertains to make and use the same, reference being had to the accompanying drawings, forming part of this specification.

This invention relates to electric motors, and more particularly to improvements in that type of electric motors which, without any change whatever in the motor or in connections thereto, are adapted to be operated by either single-phase alternating currents of the usual commercial frequencies or direct current of the same voltage and commonly known as universal motors.

To avoid repetition the term "universal motor" as used throughout this specification is defined as a motor which, without any change whatever in the motor or in connection thereto, yields the same speed of rotation on either single phase alternating current of commercial frequencies or direct current under conditions of substantially the same impressed voltage and same or equal loads.

This invention further relates to a certain combination of elements, together with proportions of these elements in an electric motor by virtue of which the motor yields the same speed of rotation on either single phase alternating current or direct current under conditions of substantially the same impressed voltage and load.

Heretofore universal motors have been made in various ways, but so far as I am aware all of these motors operate at very high speeds and there is a great divergence in speeds on the respective forms of current when the load is great enough to prevent the motors operating at the intended normally high speed. For this reason the practical application of universal motors heretofore has been limited to very high speed apparatus.

While it is true that universal motors have been applied to apparatus requiring lower speeds, the great difference in torque at these lower speeds on the respective currents has made it necessary to introduce adapting complications such as double or independent field windings, a regulating resistance in series with the motor, or various forms of governors which have been employed for the purpose of compensating for the difference in torque which would otherwise exist in the use of the respective forms of current at the lower speeds.

The primary object of my invention, therefore, is to produce a motor which will be universal in the sense used in this specification at the lower and more practicable speeds of 1000 to 1800 r. p. m.

A further object of my invention is to provide a motor which will operate uniformly at these lower speeds on the different forms of current specified without the use of auxiliary or adaptive apparatus of any kind, or changes of connections for the respective forms of current.

A still further object of my invention is to provide a universal motor in which the same windings in both stator and rotor are utilized on both forms of current and which will give substantially uniform performances at the specified lower speeds on either form of current.

A further object of my invention is to provide a universal motor such that the direction of its rotation may be reversed without any internal changes or adjustments in the motor, but at a distance when desirable by making simple changes in electrical connections leading to the motor.

Other and further objects of my invention will be obvious, or pointed out hereinafter, reference being had to the accompanying drawings forming a part of this specification, and in which—

Figure 1:
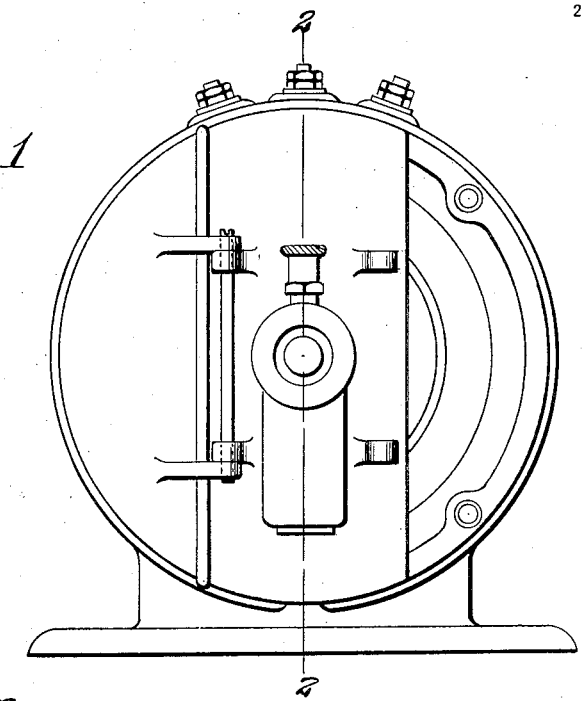
Figure 1 is an end elevational view with part of the casing removed showing an approved form of motor casing with which my invention may be used.
Figure 2:
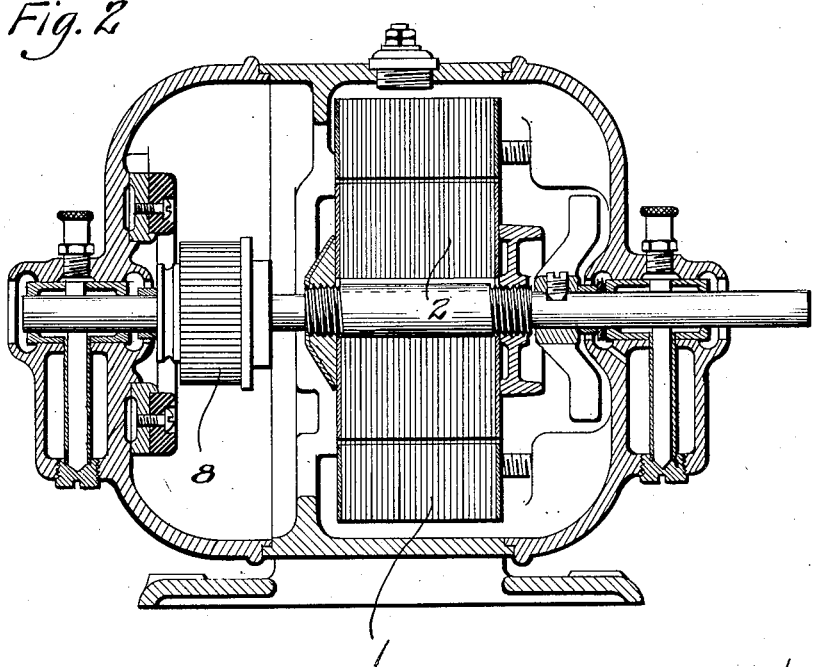
Fig. 2 is a sectional view on line 2—2 of Fig. 1.
Figure 3:
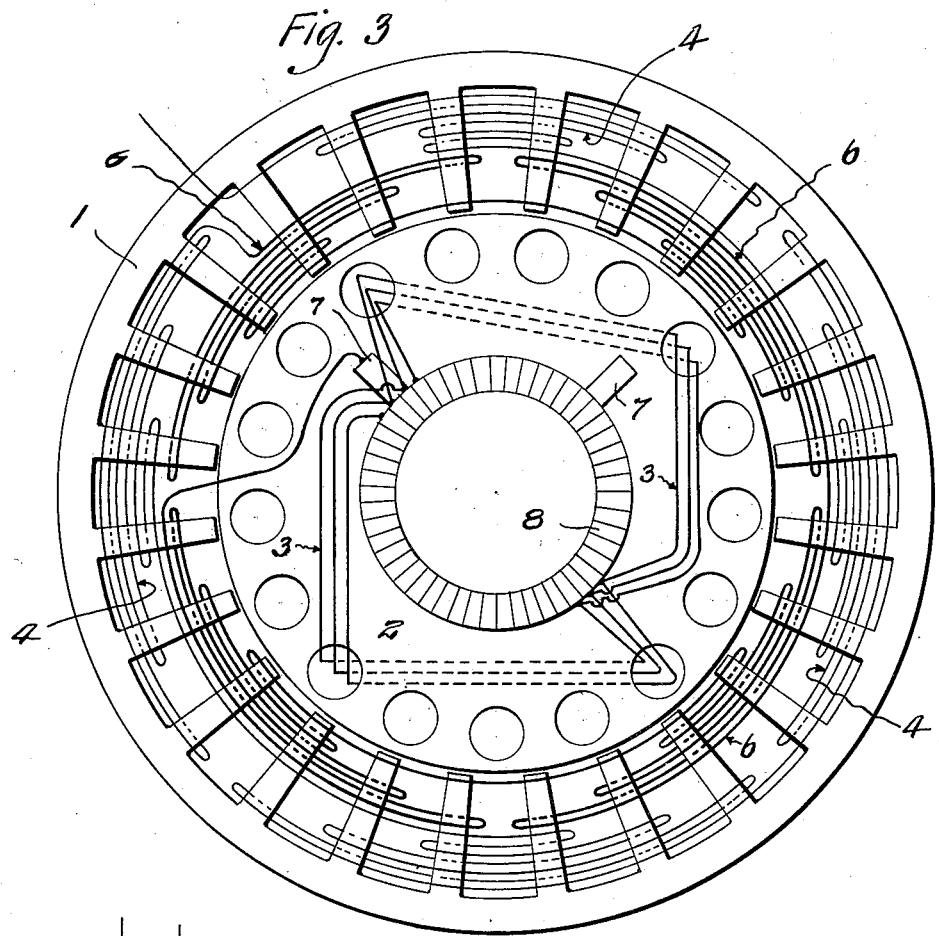
Fig. 3 is a diagrammatic view illustrating the internal windings of my improved motor.
Figure 4:
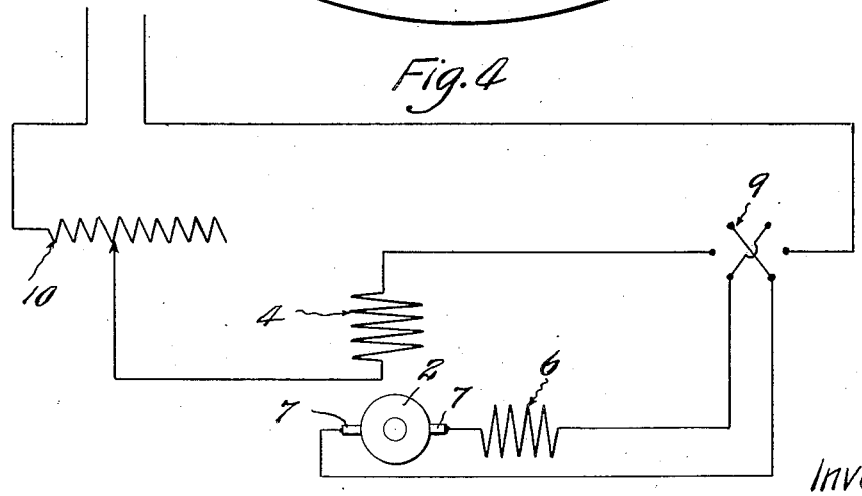
Fig. 4 is a diagrammatic view showing the external circuit arrangement for the motor.

My preferred form of motor is diagrammatically shown in Figs. 3 and 4, and consists of the usual laminated toothed field-core 1; numeral 4 indicates the main winding of the field which preferably consists of the usual "divided pole" or "pyramidal" winding, and, in addition to this main winding, I use a compensating winding 6 placed on the field between the main poles at an angle of 90 electrical-space degrees between each pair of main poles. This compensating winding is connected in series with the main winding 4. The armature core 2 is provided with windings 3 having connection with the segments of a commutator 8, in a fashion commonly employed in direct current motors. The armature windings are in series with the field windings 4 and 6 through the brushes 7. The position of the brushes 7 on the commutator 8 is at the neutral point, the same as on a direct current motor. From this it will be seen that this arrangement of main field, compensating, and armature windings involves features of both the direct current and single-phase alternating current motor.

For the purpose of a practical and commercial design, I have in mind the necessary characteristics most desired when operating on direct current and on the highest frequency of alternating current upon which the motor is designed to operate. Assuming, therefore that the motor is designed to operate both upon a direct current and upon a 60 cycle alternating current of equal voltage, and therefore upon any intermediate frequency, the observance of the following considerations is important:

In figuring the proportion of the main field windings and the armature windings, I calculate to neutralize the self-induction in the armature windings by compensating coils, (as will be explained later), but the field winding self-induction cannot be so neutralized. In order that the self-induction in the field winding be held as low as possible, I adopt, therefore, the proportions of a heavy armature winding and light main field winding. I have found that a proportion of 4 to 1 gives good results, as this reduces the main field winding to so small a proportion as to render its self-induction negligible, and this approximates the results desired.

The neutralization of the self-induction in the windings is essential to obtain a universal motor and it is necessary to neutralize this self-induction on the highest frequencies. I have found that this object is not attained in performance until the motor is running near or above synchronism for a current of predetermined number of cycles. Therefore, I adopt a two-pole winding for motors designed to operate at 3000 r. p. m. or above; a 4-pole winding for motors designed to operate at 1500 r. p. m. to 2500 r. p. m., and a six-pole winding for motors to operate at approximately 1000 r. p. m. to 1500 r. p. m.; thus making the number of poles an essential feature in securing effective operation at a desired speed. Having adopted the number of poles for the speed desired, and the proportion of say 1 to 4 as a relation of field to armature windings, in which the field winding is 1 and the armature winding 4, I estimate as for direct current a series winding to give the required amount of torque at the desired speed with the brushes of the motor in the usual position for a direct current motor.

A motor constructed as above would theoretically operate on direct current at the proper speed and torque, but practically it would give extremely bad operation on the brushes. It would also have so much self-induction on alternating current that it would give little or no power on the higher frequencies. To remedy these insufficiencies, I employ in my preferred form the compensating coils, heretofore described, they being arranged to neutralize the self-induction of the armature and prevent field distortion and the resulting poor commutation. As stated, these compensating coils are arranged on the field core, one between each pair of main poles, at an angle of 90 electrical-space degrees to each other, and they are of sufficient strength, when connected in series with the armature winding, to effectively neutralize the self-induction of this winding when operating on alternating current. The number of turns in this winding is preferably slightly less than the effective number of turns in the armature winding, and therefore appreciably greater than the number in the field windings 4.

It will be understood from the foregoing that my invention contemplates a multi-polar field, that is, a field having more than two poles, and a wound armature in series with the field windings through suitable commutator means.

It will be seen further that my invention contemplates the provision of suitable means or arrangement for neutralizing self-induction in the armature.

As constructed in the fashion above described, or the equivalent thereof, the four-pole motor will be universal in the sense contemplated herein at a speed of substantially 1800 r. p. m. The performances will remain substantially uniform at all higher speeds approaching very closely the no-load speed of the motor. With a six-pole construction, the performances of the motor will be uniform on direct and 60 cycle alternating currents at and above a speed of substantially 1200 r. p. m.

In Fig. 4 I have shown diagrammatically a reversing switch arranged outside the motor whereby the direction of rotation of the motor may be reversed. By the operation of this switch the direction of current in the field with respect to that in the compensating and armature windings may be changed. At 10 is shown a resistance whereby the motor speed can be regulated in either direction by an ordinary resistance box of suitable proportions.

It is possible in my improved form of motor to make up the motors complete except for the introduction of the windings which determine the number of poles the motor shall have, and then, when the desired speed of the finished motor is known, to finish the motor by introducing a requisite number of coils and making the proper connections and brush adjustments.

So far as I am aware I am the first to construct a universal motor complete in its essential parts and which is capable by the introduction of the windings which determine the number of poles, of producing universal characteristics at these reduced speeds. The demand for motors of this character operating at the low speeds herein mentioned, and giving the same performances and possessing the characteristics of either a straight direct current motor or a straight alternating current motor, is much larger than the demand for motors of this universal type operating at the higher speeds, and it will be seen that it is a distinct advantage in the manufacture of motors to build them so that they are nearly complete and then be able to determine the ultimate speed by the number of poles produced by the windings.

It will be understood from the foregoing that, while I have shown and illustrated a certain form and proportions, I do not limit myself to either this exact construction or proportions, as variations from this construction and these proportions may become advisable from time to time without departing from the essential elements and combinations of my invention.

I claim:

1. A motor designed for operation on alternating and direct currents inclusively, comprising field windings arranged to provide distributed poles, compensating windings associated with the said field windings and arranged at substantially an angle of ninety electrical degrees relative thereto, the compensating windings comprising a relatively greater number of turns than the field windings, rotor windings comprising a relatively greater number of turns than the compensating windings, and commutator mechanism arranged to connect rotor windings in series with the stator windings and including brushes disposed in the neutral position.

2. A motor for operation on direct and alternating currents inclusively, including distributed field windings, distributed compensating windings having a relatively greater number of turns than the field windings and disposed in association with the field windings at a relative angle of ninety electrical degrees, distributed rotor windings containing a relatively greater number of turns than the compensating windings, a commutator mechanism arranged to connect rotor windings in series with the stator windings and including contact brushes disposed in the neutral position, and means external of the motor for changing the relative direction of current supply to the rotor and field windings whereby to reverse the direction of operation of the rotor.

3. A motor for operation on alternating and direct currents inclusively, including a laminated field frame, distributed field windings disposed thereon, distributed armature windings, a laminated armature frame carrying said armature windings, commutator mechanism for connecting armature windings in series with the field windings and including brushes disposed in the neutral position, and compensating windings disposed on the field frame at an angle of ninety electrical degrees relative to the field windings and comprising a relatively greater number of turns than the field windings and less than the armature windings, said compensating windings being connected in series with the field windings, and means external of the motor for reversing the direction of current supply to the compensating windings relative to that of the field windings.

4. In a motor operable on direct and alternating currents inclusively, the combination of distributed field windings forming a plurality of poles, distributed compensating windings arranged in series with the field windings and disposed in overlapping relationship therewith at an angle of substantially ninety electrical degrees relative thereto, said compensating windings comprising a relatively greater number of turns than the field windings, armature windings disposed in inductive relationship relative to the field and compensating windings and containing a relatively greater number of turns than the compensating windings, commutator mechanism including brushes disposed in the neutral position and arranged to connect armature windings in series with the compensating windings, and means external of the motor for changing the direction of current in the compensating and armature windings relative to that in the field windings whereby to change the direction of rotation of the motor on either form of current, the direction of current in the compensating windings being the same relative to the direction of current in the field windings for the same direction of rotation on both forms of current.

In testimony whereof I hereunto affix my signature in the presence of two witnesses, this 1st day of July, 1915.

ALLEN McRAE HARRELSON.

Witnesses:
M. P. SMITH,
M. A. HANDEL.